United States Patent
Raravi et al.

(10) Patent No.: US 8,725,156 B2
(45) Date of Patent: May 13, 2014

(54) METHODS FOR SUPPORTING MOBILE NODES IN INDUSTRIAL CONTROL AND AUTOMATION SYSTEMS AND OTHER SYSTEMS AND RELATED APPARATUS

(75) Inventors: Channabasavaraj Raravi, Karnataka (IN); Arun V. Mahasenan, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 747 days.

(21) Appl. No.: 12/417,421

(22) Filed: Apr. 2, 2009

(65) Prior Publication Data

US 2010/0254345 A1    Oct. 7, 2010

(51) Int. Cl.
   *H04W 36/00*    (2009.01)

(52) U.S. Cl.
   USPC ........ 455/441; 455/452.2; 455/436; 455/450; 455/456.5; 455/456.6; 370/331; 370/329

(58) Field of Classification Search
   USPC ........ 455/436–444, 404.1, 404.2, 456.1–457, 455/63.1, 65, 67.11, 67.13, 422.1, 450–455, 455/464, 509; 370/321–337, 339, 341–348, 370/431–463; D10/104.2; 340/539.13, 340/988–996
   See application file for complete search history.

(56) References Cited

U.S. PATENT DOCUMENTS

| | | | |
|---|---|---|---|
| 5,555,445 A * | 9/1996 | Booth | 455/436 |
| 5,640,679 A * | 6/1997 | Lundqvist et al. | 455/525 |
| 6,529,733 B1 * | 3/2003 | Qing-An | 455/437 |
| 7,010,294 B1 * | 3/2006 | Pyotsia et al. | 455/420 |
| 7,382,740 B2 * | 6/2008 | Joshi | 370/254 |
| 8,160,640 B2 * | 4/2012 | Rofougaran et al. | 455/556.1 |
| 2005/0181799 A1 * | 8/2005 | Laroia et al. | 455/450 |
| 2006/0009224 A1 * | 1/2006 | Lim et al. | 455/442 |
| 2006/0039332 A1 * | 2/2006 | Kotzin | 370/338 |
| 2008/0002614 A1 * | 1/2008 | Hanabusa et al. | 370/328 |
| 2009/0117934 A1 * | 5/2009 | Biehler | 455/525 |
| 2009/0203379 A1 * | 8/2009 | Karaoguz | 455/436 |

OTHER PUBLICATIONS

Nasif Ekiz, et al., "An Overview of Handoff Techniques in Cellular Networks", International Journal of Information Technology vol. 2 No. 2, Aug. 5, 2005, p. 132-136.

* cited by examiner

*Primary Examiner* — Ronald Eisner (57) ABSTRACT

A method includes providing wireless service to a mobile leaf node using at least one first infrastructure node in an industrial control or monitoring system. The method also includes detecting movement of the mobile leaf node away from the at least one first infrastructure node.

The method further includes handing off the mobile leaf node to at least one second infrastructure node in the industrial control or monitoring system so that the at least one second infrastructure node provides the wireless service to the mobile leaf node. The wireless service provided to the mobile leaf node remains deterministic. Various techniques can be used to detect the movement of the mobile leaf node. Also, the first and second infrastructure nodes could be in different clusters of nodes, and various techniques can be used to support handoffs between infrastructure nodes in different clusters.

20 Claims, 8 Drawing Sheets

METHODS FOR SUPPORTING MOBILE NODES IN INDUSTRIAL CONTROL AND AUTOMATION SYSTEMS AND OTHER SYSTEMS AND RELATED APPARATUS

TECHNICAL FIELD

This disclosure relates generally to wireless networks and more specifically to methods for supporting mobile nodes in industrial control and automation systems and other systems and related apparatus.

BACKGROUND

Processing facilities and other facilities are often managed using control systems. Example facilities include manufacturing plants, chemical plants, crude oil refineries, and ore processing plants. Among other operations, control systems typically monitor or manage the use of motors, valves, or other equipment in the facilities. Control systems routinely include one or more wireless networks containing various wireless devices, such as wireless sensors or wireless actuators.

SUMMARY

This disclosure provides methods for supporting mobile nodes in industrial control and automation systems and other systems and related apparatus.

In a first embodiment, a method includes providing wireless service to a mobile leaf node using at least one first infrastructure node in an industrial control or monitoring system. The method also includes detecting movement of the mobile leaf node away from the at least one first infrastructure node. The method further includes handing off the mobile leaf node to at least one second infrastructure node in the industrial control or monitoring system so that the at least one second infrastructure node provides the wireless service to the mobile leaf node. The wireless service provided to the mobile leaf node remains deterministic.

In a second embodiment, a system includes a plurality of infrastructure nodes each configured to provide wireless service in a specified area. The plurality of infrastructure nodes includes at least one first infrastructure node and at least one second infrastructure node. The system also includes a mobile leaf node configured to perform one or more functions associated with an industrial control or monitoring system. When the mobile leaf node is receiving the wireless service from the at least one first infrastructure node, movement of the mobile leaf node away from the at least one first infrastructure node triggers a handoff of the mobile leaf node to the at least one second infrastructure node so that the at least one second infrastructure node provides the wireless service to the mobile leaf node. The wireless service provided to the mobile leaf node remains deterministic.

In a third embodiment, an apparatus is configured to perform one or more functions associated with an industrial control or monitoring system. The apparatus includes a transceiver configured to communicate wirelessly with a plurality of infrastructure nodes including at least one first infrastructure node and at least one second infrastructure node. The apparatus also includes a controller configured, in response to a trigger from the at least one first infrastructure node providing wireless service to the apparatus, to initiate a handoff to the at least one second infrastructure node so that the at least one second infrastructure node provides the wireless service to the apparatus. The wireless service provided to the apparatus remains deterministic.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
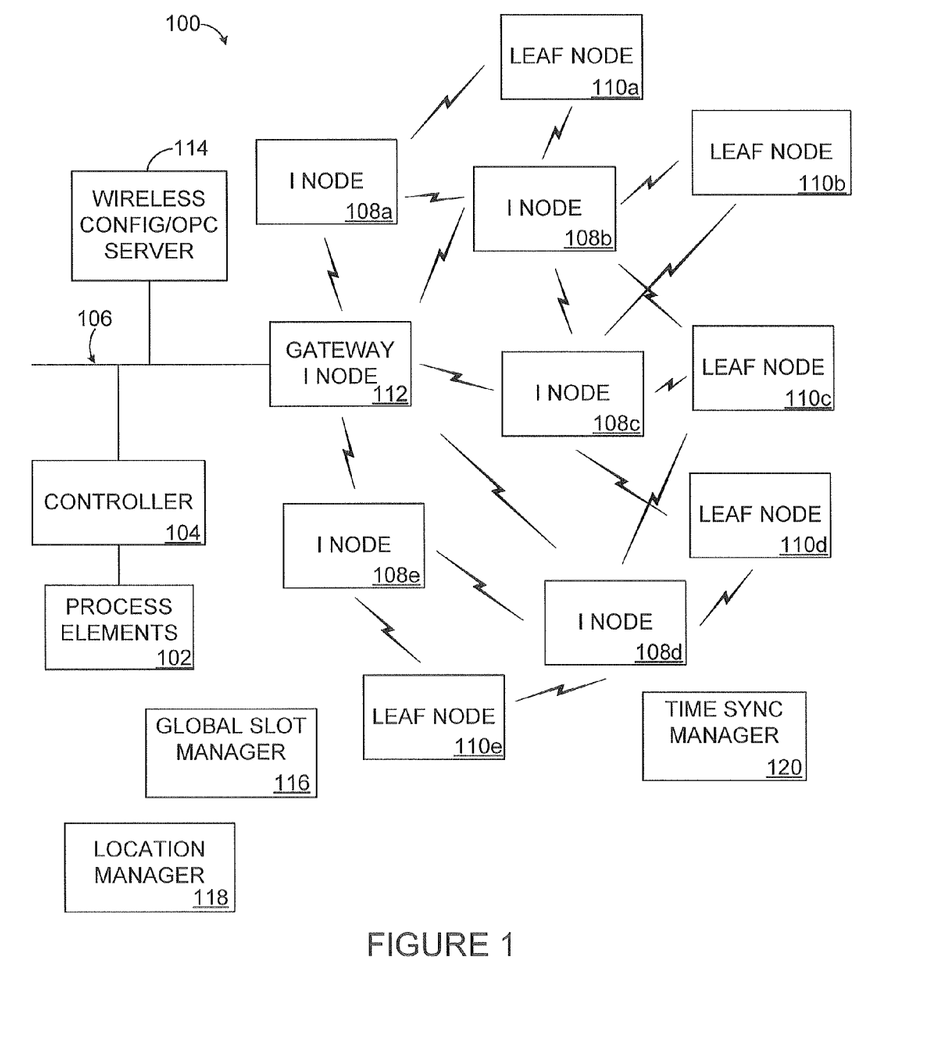
FIG. 1 illustrates an example industrial control and automation system according to this disclosure.

FIG. 1 illustrates an example industrial control and automation system 100 according to this disclosure. In this example embodiment, the industrial control and automation system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the industrial control and automation system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices. Leaf nodes 110a-110e typically represent devices powered by local power supplies, such as nodes that receive operating power from internal batteries or other internal power supplies. Leaf nodes 110a-110e are often more limited in their operations in order to help preserve the operational life of their power supplies.

The nodes 108a-108e and 110a-110e include any suitable structures facilitating wireless communications, such as radio frequency (RF) frequency-hopping spread spectrum (FHSS) or direct sequence spread spectrum (DSSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the wireless network. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may also convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the industrial control and automation system 100. For example, the server 114 could configure the operation of the nodes 108a-108e, 110a-110e, and 112. The server 114 could also support security in the industrial control and automation system 100, such as by distributing cryptographic keys or other security data to various components in the industrial control and automation system 100 (like the nodes 108a-108e, 110a-110e, and 112). The server 114 includes any hardware, software, firmware, or combination thereof for configuring wireless networks and providing security information.

A global slot manager 116 facilitates the identification and assignment of time slots to nodes in the wireless network. For example, communications between the nodes could occur during multiple time slots. The global slot manager 116 determines which time slots are assigned to a node for communications with other nodes. The global slot manager 116 includes any hardware, software, firmware, or combination thereof for managing time slots used for wireless communications.

A location manager 118 tracks the locations of various nodes in the industrial control and automation system 100. For example, the location manager 118 may receive the fixed locations of one or more infrastructure nodes 108a-108e and 112. Also, one or more of the leaf nodes 110a-110e could be mobile, and the location manager 118 can monitor the locations of those nodes 110a-110e. As described in more detail below, the location manager 118 can provide this information to support "handoffs," where communications with a leaf node are transferred from one infrastructure node to another. The location manager 118 includes any hardware, software, firmware, or combination thereof for tracking locations of nodes.

A time synchronization manager 120 facilitates the synchronization of nodes in a wireless network. For example, nodes can be grouped into clusters, where nodes in a cluster are substantially synchronized with one another. The time synchronization manager 120 can help maintain synchronization of nodes and control merging of clusters. As a particular example, the time synchronization manager 120 can help a leaf node to synchronize with a new cluster that the leaf node is joining as a result of the leaf node's movement away from its current cluster. The time synchronization manager 120 includes any hardware, software, firmware, or combination thereof facilitating synchronization of wireless network nodes.

In one aspect of operation, various nodes in the wireless network (such as the leaf nodes 110a-110e) are mobile and can move within the industrial control and automation system 100. This mobility may provide various challenges in the system 100. For example, the mobility of a leaf node may lead to a loss of wireless connectivity or non-deterministic behavior. Also, the mobility of a leaf node may lead to a reduction in the battery life of the node's power supply due to, for example, the need for periodic discovery and re-association with infrastructure nodes.

Note that the leaf nodes may represent non-continous transmitters. For example, leaf nodes could be configured to transmit once every one, five, or thirty seconds. This can make it more difficult to detect when a leaf node is moving since data about the leaf node is non-continuous. Moreover, each leaf node could communicate using a different frequency-hopping pattern and can possibly jump between clusters during operation, which is a problem not typically found in cellular communications systems. Another problem not typically found in cellular communications systems is that leaf nodes may need to maintain redundant connectivity while mobile whenever possible.

In accordance with this disclosure, other nodes in the wireless network (such as the infrastructure nodes 108a-108e and 112) can perform actions to support this mobility. For example, among other things, the infrastructure nodes 108a-108e and 112 can engage in handoffs to support moving leaf nodes 110a-110e. This may allow a moving leaf node to continue to receive wireless service even as the leaf node moves away from some infrastructure nodes and towards others. This can also be done in a way that helps to preserve the battery life of the leaf nodes. Various handoff techniques are described in more detail below.

Although FIG. 1 illustrates one example of an industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where mobility techniques can be used to support mobile wireless nodes. This functionality could be used with any other suitable system (whether or not process control-related). As a particular example, this functionality could be used in a system implementing the ISA100 standard for industrial control. As another example, this functionality could be used in a ONE-WIRELESS system from HONEYWELL INTERNATIONAL INC. Details of this type of system can be found in U.S. Provisional Patent Application No. 61/055,817, which is hereby incorporated by reference.

Figure 2:
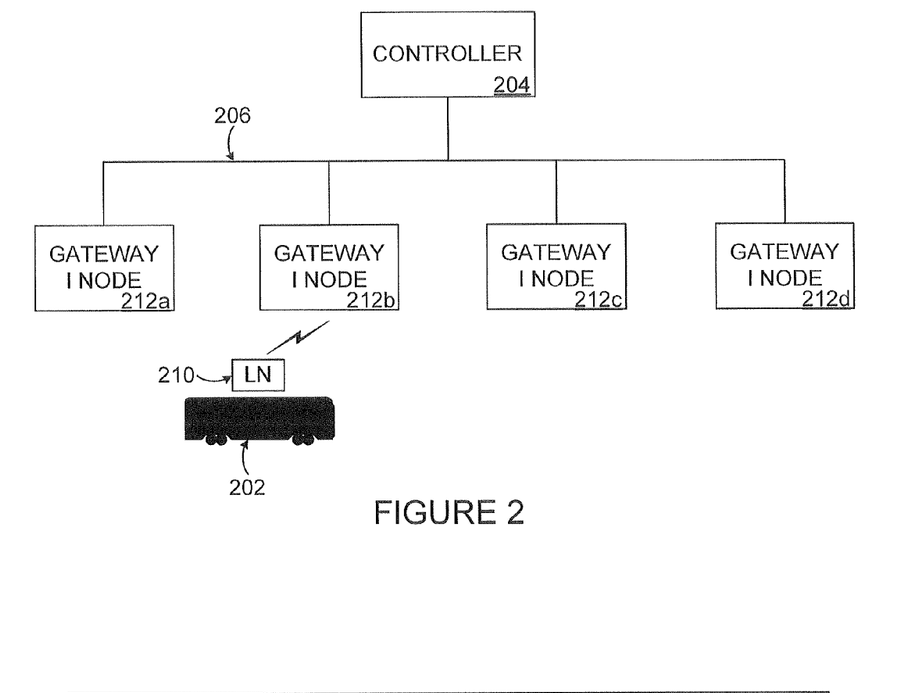
FIG. 2 illustrates an example rail car monitoring system according to this disclosure.

FIG. 2 illustrates an example rail car monitoring system 200 according to this disclosure. In this example, the system 200 is used to monitor one or more rail cars 202. Each rail car 202 represents any suitable rail car to be monitored, such as a tanker car, a container car, or a locomotive engine. In particular embodiments, the rail cars 202 being monitored represent tanker cars carrying caustic or other hazardous materials.

The rail car monitoring system 200 also includes a controller 204, a network 206, one or more leaf nodes 210, and multiple gateway infrastructure nodes 212a-212d. Each leaf node 210 could be associated with a rail car 202 being monitored. For example, a leaf node 210 could be used to measure a level of material in a tanker car, although the leaf node 210 could be used to measure any other or additional characteristic(s) associated with the rail car 202. The leaf node 210 can also communicate and exchange information with the gateway infrastructure nodes 212a-212d. The gateway infrastructure nodes 212a-212d could, for example, be placed in different railway stations. In this way, information associated with the rail cars 202 can be obtained as a train reaches each railway station. The controller 204 and the network 206 are optional and can be used to facilitate centralized monitoring of the rail cars 202. The analysis of readings from the leaf nodes 210 could also be performed by a controller connected locally to a gateway infrastructure node or by control logic implemented within a gateway infrastructure node. If no communication over a network 206 is required, the gateway infrastructure nodes 212a-212d in FIG. 2 may be replaced by non-gateway infrastructure nodes.

In this embodiment, the movement of the leaf node 210 may be more constrained than movement of the leaf nodes in FIG. 1. For example, in FIG. 1, the leaf nodes may be able to roam freely in a wide area (although physical boundaries or security mechanisms could limit movement to some extent). In FIG. 2, however, movement of the leaf node 210 is more constrained by the fact that the rail car 202 may follow only one or a limited number of paths (defined by the railroad tracks). For these or other reasons, there may be little or no need for a global slot manager, location manager, or time synchronization manager (although one or more of those components could be used in the system 200).

In one aspect of operation, the leaf node 210 may measure one or more characteristics of the rail car 202, such as the level of material in a tanker car. The leaf node 210 may report that information to the infrastructure nodes, which can analyze the data or forward the data to the controller 204 for analysis. The analysis could include, for example, determining whether a level of material in the tanker car is acceptable. As a particular example, this could include determining whether the tanker car is filled between 20%-80% (where lower or higher levels can trigger an alarm or other action). As with the system 100 of FIG. 1, the system 200 can implement one or more techniques to facilitate mobility of the leaf node 210. These techniques are described in more detail below.

Although FIG. 2 illustrates an example rail car monitoring system 200, various changes may be made to FIG. 2. For example, the system 200 could include any number of controllers, networks (wired or wireless), infrastructure nodes (gateway or other), leaf nodes, and rail cars. Also, the functional division shown in FIG. 2 is for illustration only. Various components in FIG. 2 could be combined, subdivided, or omitted and additional components could be added according to particular needs. In addition, FIG. 2 illustrates another example operational environment where mobility techniques can be used to support mobile nodes. This functionality could be used with any other suitable system, such as with other types of moving vehicles or conveyor belts or in other mobile applications.

Figure 3:
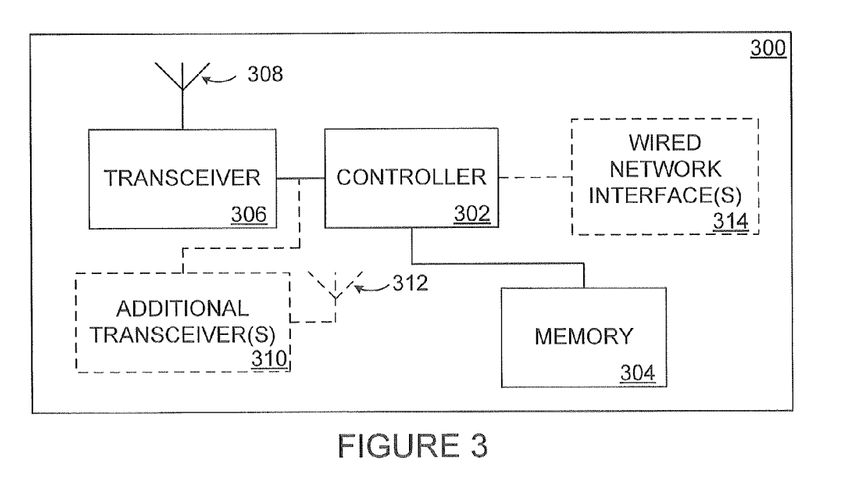
FIG. 3 illustrates an example wireless node in a wireless network according to this disclosure.

FIG. 3 illustrates an example wireless node 300 in a wireless network according to this disclosure. The wireless node 300 could, for example, represent a leaf node, infrastructure node, or gateway infrastructure node in the systems of FIGS. 1 and 2.

As shown here, the node 300 includes a controller 302, which controls the overall operation of the node 300. For example, the controller 302 may receive or generate data to be transmitted, and the controller 302 could provide the data to other component(s) in the node 300 for transmission over a wired or wireless network. The controller 302 could also receive data over a wired or wireless network and use or forward the data. As a particular example, the controller 302 in a sensor leaf node could provide sensor data for transmission, and the controller 302 in an actuator leaf node could receive and implement control signals (the leaf node could represent a combined sensor-actuator device). As another example, the controller 302 in an infrastructure node could receive data transmitted wirelessly, determine a next hop for the data (if any), and provide the data for transmission to the next hop (if any). As a third example, the controller 302 in a gateway infrastructure node 112 could receive data from a wired network and provide the data for wireless transmission (or vice versa). The controller 302 includes any hardware, software, firmware, or combination thereof for controlling operation of the node 300. As particular examples, the controller 302 could represent a processor, microprocessor, microcontroller, field programmable gate array, or other processing or control device.

A memory 304 is coupled to the controller 302. The memory 304 stores any of a wide variety of information used, collected, or generated by the node 300. For example, the memory 304 could store information received over a network that is to be transmitted over the same or other network. The memory 304 includes any suitable volatile and/or non-volatile storage and retrieval device(s).

The node 300 also includes a wireless transceiver 306 coupled to an antenna 308. The transceiver 306 and antenna 308 can be used to communicate wirelessly with other devices. For example, in a leaf node, the transceiver 306 and antenna 308 can be used to communicate with infrastructure nodes. In an infrastructure or gateway infrastructure node, the transceiver 306 and antenna 308 can be used to communicate with leaf nodes or other infrastructure nodes. One or more additional transceivers 310 could also be used in the node 300. For instance, in an infrastructure or gateway infrastructure node, the additional transceiver(s) 310 could be used to communicate with Wi-Fi or IEEE 802.11 devices (such as wireless controllers or hand-held user devices) or other infrastructure or gateway infrastructure nodes. The additional transceivers 310 may be coupled to their own antennas 312 or share one or more common antennas (such as antenna 308). Each transceiver includes any suitable structure for transmitting and/or receiving wireless signals. In some embodiments, each transceiver represents an RF transceiver, such as an RF FHSS or DSSS transceiver. Also, each antenna could represent an RF antenna. It may be noted that any other suitable wireless signals could be used to communicate. In addition, each transceiver could include a transmitter and a separate receiver.

If the node 300 represents a gateway infrastructure node, the node 300 may further include one or more wired network interfaces 314. The wired network interfaces 314 allow the node 300 to communicate over one or more wired networks, such as the network 106 or 206. Each wired network interface 314 includes any suitable structure for transmitting and/or receiving signals over a wired network, such as an Ethernet interface.

Although FIG. 3 illustrates one example of a wireless node 300 in a wireless network, various changes may be made to FIG. 3. For example, various components in FIG. 3 could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

FIGS. 4 through 13 illustrate example methods and related details for supporting mobile nodes in industrial control and automation systems and other systems according to this disclosure. At least one particular technique shown here could be used in a specific system depending on the needs and structure of that system.

In some embodiments, a leaf node may be configured to communicate with multiple infrastructure nodes at the same time, such as two infrastructure nodes. When the leaf node loses connectivity to one of its serving infrastructure nodes, the leaf node can engage in a partial link failure procedure, where the leaf node attempts to identify an alternate infrastructure node. When the leaf node loses connectivity to both serving infrastructure nodes, the leaf node can engage in a complete link failure procedure, where the leaf node attempts to identify any alternate infrastructure nodes. This functionality can also be used to support mobility of the leaf node.

Figure 4:
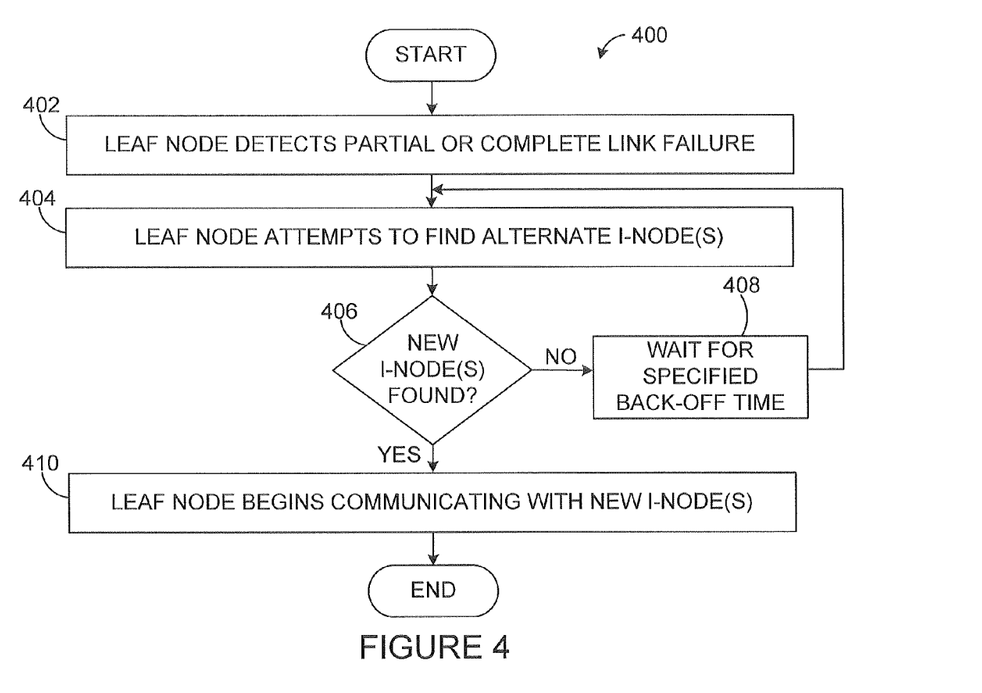
FIGS. 4 through 13 illustrate example methods and related details for supporting mobile nodes in industrial control and automation systems and other systems according to this disclosure.

In FIG. 4, a method 400 is used to support hard handoffs between infrastructure nodes. The method 400 includes a leaf node detecting a complete or partial link failure at step 402. This could include, for example, the leaf node detecting an actual loss of connectivity with one (partial) or both (complete) infrastructure nodes currently serving the leaf node. The leaf node attempts to locate one or more alternate infrastructure nodes at step 404. This could include, for example, the leaf node attempting to identify transmissions from one or more infrastructure nodes in the vicinity of the leaf node. This could also include the leaf node "chirping" or broadcasting a request for service. If no alternate infrastructure nodes are found at step 406, the leaf node may optionally wait for a specified back-off time at step 408, and the leaf node returns to step 404. Any amount of back-off time could be used here, such as 70 seconds plus a random time between 0 seconds and 128 seconds. In particular embodiments, the back-off time could be set to zero for moving leaf nodes and non-zero for stationary leaf nodes. Any suitable mechanism could be used to select the proper back-off time, such as an accelerometer or other mechanism in the leaf node to detect movement. This process may continue until at least one alternate infrastructure node is found or until a timeout occurs (to help conserve battery power). When one or more alternate infrastructure nodes are found, the leaf node associates with the alternate infrastructure node(s) and begins communicating with the alternate infrastructure node(s) at step 410. This could include, for example, the leaf node and the new infrastructure node(s) establishing medium access control (MAC) and security connections between each other.

Figure 5:
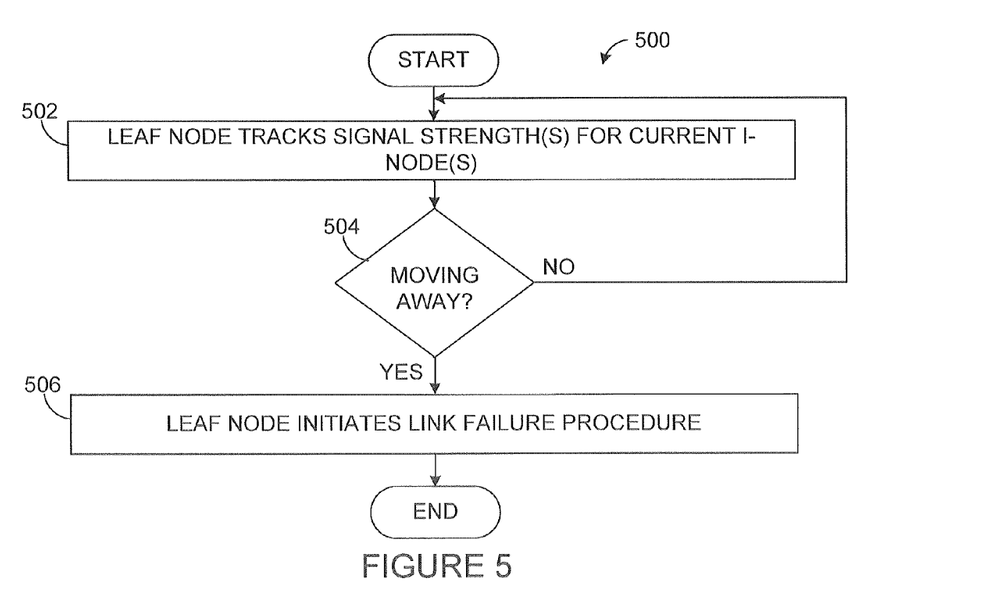

In FIG. 5, a method 500 is used to support leaf node-assisted hard handoffs between infrastructure nodes. A leaf node tracks the signal strength for each of its serving infrastructure nodes at step 502. This could include, for example, the leaf node determining a receive signal strength indicator (RSSI) for each of its current infrastructure nodes. Using the RSSI indicators or other signal strengths, the leaf node can determine whether it is moving away from any of its serving infrastructure nodes at step 504. This could include, for example, the leaf node determining whether the RSSI value for a particular infrastructure node has at least a specified rate of change or falls below a specified level. Once movement away from an infrastructure node is determined, the leaf node initiates a link failure procedure at step 506. This may include, for example, the leaf node performing steps 404-410 from FIG. 4 to select a new infrastructure node. Note that this is done at a time when communications with the original serving infrastructure nodes are still possible, so no loss of connectivity may have occurred when the handoff occurs.

Figure 6:
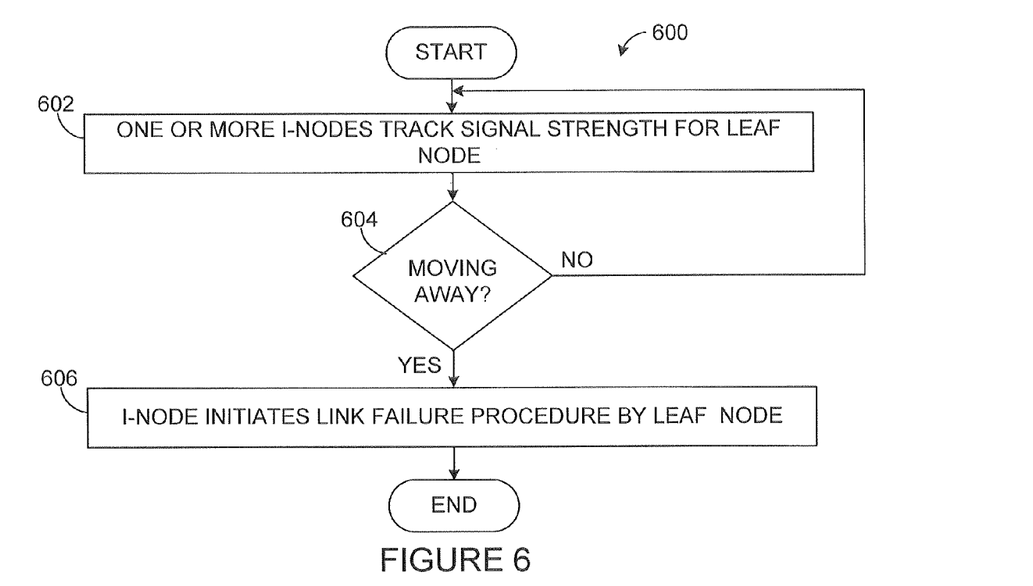

In FIG. 6, a method 600 is used to support infrastructure node-assisted hard handoffs. In this example, each infrastructure node currently serving a leaf node tracks the signal strength for the leaf node at step 602. This may include, for example, each infrastructure node tracking the RSSI or other signal strength for the leaf node. The infrastructure nodes determine whether the leaf node is moving away at step 604. This could include, for example, each infrastructure node determining whether the RSSI value or other signal strength of the leaf node has at least a specified rate of change or falls below a specified value. This could also include the infrastructure nodes using a direction of arrival (DOA) or time of arrival (TOA) of signals from the leaf node to identify movement of the leaf node. Any other or additional technique(s) could also be used to identify movement of the leaf node. If movement away is detected, one or more of the infrastructure nodes initiates a link failure procedure by the leaf node at step 606. This may include, for example, the leaf node performing steps 404-410 in FIG. 4 to select one or more new infrastructure nodes. Once again, this can be done before communication is lost with the current serving infrastructure nodes.

Figure 7:
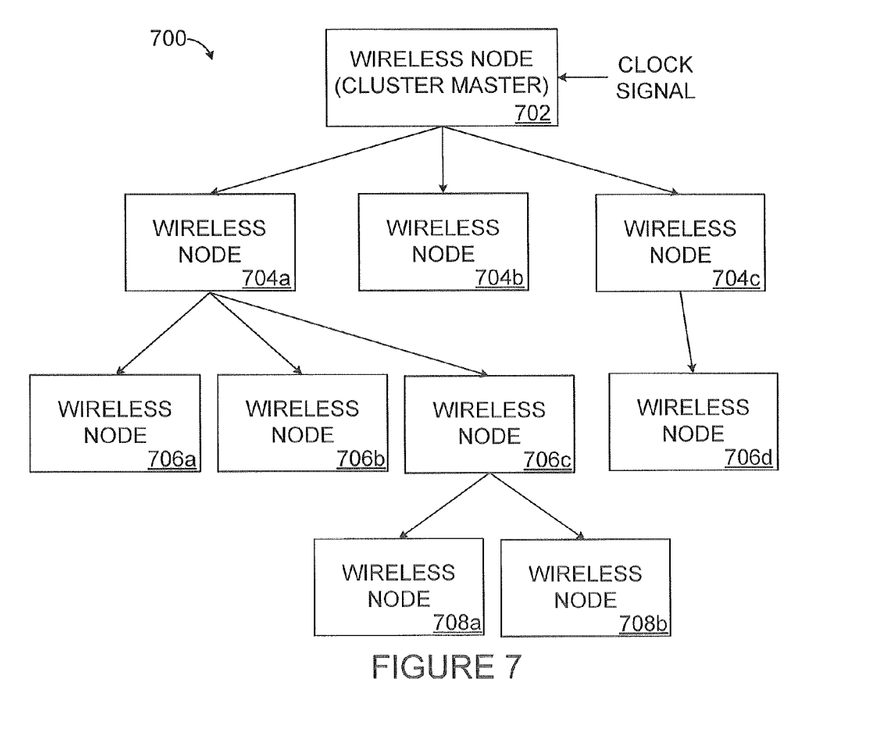

Using any of the methods shown in FIGS. 4 through 6, an additional issue may need to be resolved depending on the system in which the leaf node is used. As noted above, in some embodiments, leaf nodes in a wireless network are arranged in clusters. An example of this is shown in FIG. 7, which illustrates a cluster 700 of wireless nodes. As shown in FIG. 7, the wireless nodes in the cluster 700 are arranged in a hierarchy, where one or more nodes in one level pass time synchronization information to one or more nodes in a lower level. The cluster 700 includes a single wireless node 702, which represents a cluster master, in its highest level. The cluster master represents the wireless node that generates or receives a clock signal and then sends out timing information to other nodes in the cluster 700. The wireless node 702 could receive a clock signal from any suitable source, such as an atomic clock, a global positioning system (GPS) clock, or other source that may or may not be part of the cluster.

During operation, the wireless node 702 provides time synchronization information (such as information based on the clock signal) to nodes 704a-704c in the next level of the cluster 700. The wireless nodes 704a and 704c pass the time synchronization information to wireless nodes 706a-706c and 706d, respectively, in the next level of the cluster 700. The wireless node 706c provides the time synchronization information to wireless nodes 708a-708b in the last level of the cluster 700. In this configuration, the nodes form a spanning tree with the cluster master as the root of the spanning tree. Each of the wireless nodes 704a-708c could synchronize its internal clock with the time synchronization information it receives. In this way, the wireless nodes 704a-708c can be substantially synchronized with the wireless node 702.

Here, nodes of the spanning tree that do not pass information to a lower level could represent mobile leaf nodes or other leaf nodes. Nodes of the spanning tree that do pass information to a lower level could represent infrastructure nodes. Multiple clusters 700 may exist in a single wireless network. As a result, when a handoff occurs between infrastructure nodes for a leaf node, it is possible that the leaf node could jump from one cluster to another. This may cause problems since, for example, the clusters could have slightly different timings.

Figure 8:
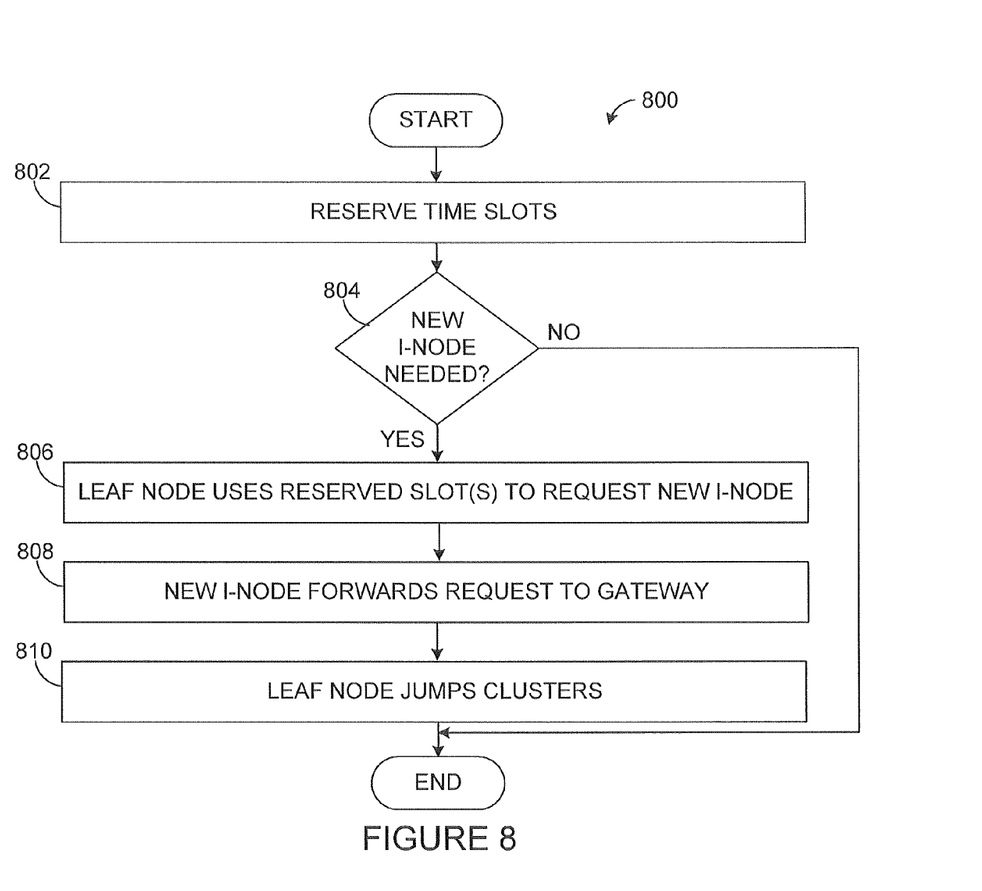

FIG. 8 illustrates an example method 800 for handling this issue. Time slots are reserved for handoff operations at step 802. This could include, for example, reserving certain time slots when communications will occur using a known frequency pattern. If a leaf node needs to use the time slots to request service from a new infrastructure node at step 804, the leaf node uses one or more of the reserved slots to request communications with one or more new infrastructure nodes at step 806. This could include, for example, the leaf node publishing requests during those reserved time slots. The leaf node could also engage in clear channel assessment (CCA) and random back-off operations to determine whether it can transmit during those reserved slots. Any infrastructure node that detects the published requests could forward the requests to a gateway node at step 808. The gateway node could then forward the request to the appropriate destination (such as the slot manager) for use in assigning a new time slot in a new cluster to the leaf node. The leaf node then jumps clusters at step 810. When the cluster change occurs, the leaf node could take one or several actions to keep its connection to an infrastructure node alive during a handoff, even though the cluster times may be different. For example, while performing a handoff, the leaf node could publish data to both the old and new infrastructure nodes within the different clusters. The leaf node could also break its link with the old cluster during the handoff but temporarily use the handoff time slots to publish data to the old infrastructure node (so the leaf node is publishing while in handoff or discovery mode). Note that the leaf node could also use these reserved time slots in case an existing connection with an infrastructure node becomes weak so that the published requests reach a gateway infrastructure node substantially at all times.

Figure 9:
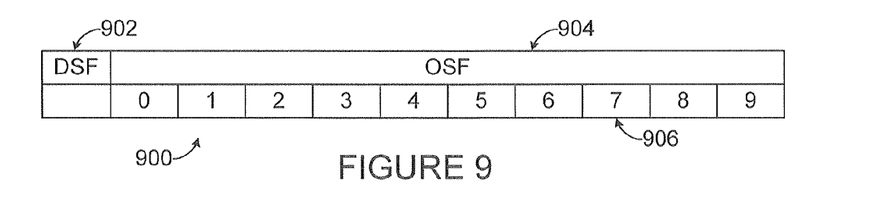

Example time slots that could be used (and reserved) in a wireless network are shown in FIG. 9. In some embodiments, communications between nodes in a wireless network could occur as follows. A hyperperiod can be defined as a thirty second (or other) periodic cycle. Within each hyperperiod is a discovery time period (DTP), such as a ten second period. The DTP is subdivided into repeating frames, an example of which is shown in FIG. 9. A frame 900 could, for example, represent a 250 millisecond frame. Within each frame 900 is a discovery subframe (DSF) 902 (which occupies the first 11 milliseconds of the frame 900) and an operation subframe (OSF) 904 (which occupies the remainder of the frame 900). The operation subframe 904 is divided into time slots 906 (such as ten slots). Note that the use of time slots can help to provide deterministic communications with a leaf node since, for example, communications with the leaf node will occur during specific times.

Nodes engage in various handshaking and other operations during the discovery subframe 902. For example, infrastructure nodes 108a-108e could broadcast beacon signals during the discovery subframe 902, allowing other nodes to identify the infrastructure nodes. This may allow new nodes coming online in the wireless network or mobile leaf nodes to identify potential infrastructure nodes that can communicate with the new nodes or mobile leaf nodes. The operation subframe 904 then allows the nodes to exchange data being transported through the wireless network, such as sensor data sent from leaf nodes or actuator data sent to leaf nodes. In the operation subframe 904, various slots 906 could be reserved for publications by leaf nodes attempting to find new infrastructure nodes (and that might jump clusters in the process).

Figure 10:
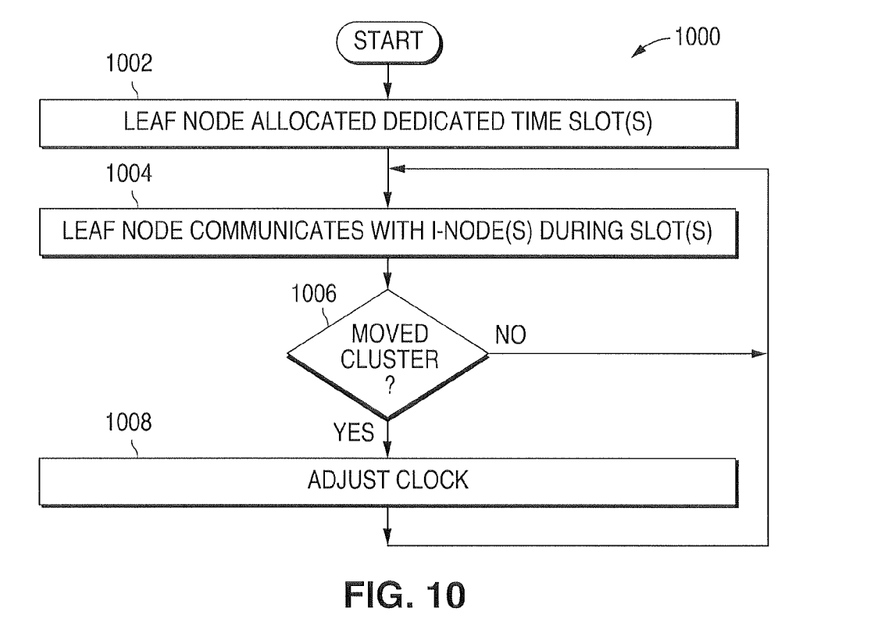

In FIG. 10, a method 1000 is used to support fast handoffs of mobile leaf nodes. Each leaf node is allocated one or more dedicated time slots at step 1002. These slots are allocated in multiple infrastructure nodes, so each leaf node can communicate with any of those infrastructure nodes during those slots at step 1004. If a leaf node happens to jump clusters at step 1006, the leaf node adjusts its clock at step 1008. This could include, for example, the leaf node performing a clock sync operation, such as by chirping and listening for a response (and adjusting its clock based on the response). Note that the reservation of time slots for a leaf node can be done dynamically, such as by dynamically allocating time slots in infrastructure nodes that are along the leaf node's path of movement (trajectory).

Figure 11:
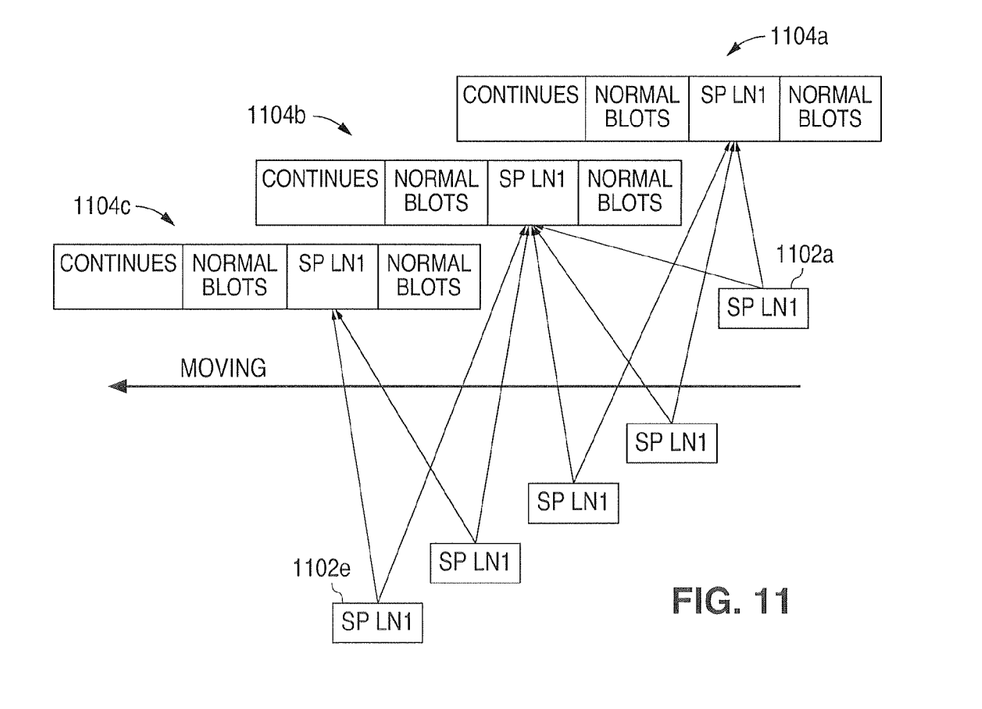

An example of this technique is shown in FIG. 11, which illustrates a leaf node moving from an initial position 1102a to a final position 1102e through several intermediate positions 1102b-1102d. In these positions, the leaf node communicates with three infrastructure nodes 1104a-1104c, defined in FIG. 11 by their time slot structures. As shown here, the leaf node is assigned a dedicated time slot by each infrastructure node, enabling the leaf node to receive service from the infrastructure nodes despite its movement.

In particular embodiments of the method 1000, only a subset of the leaf nodes in a system may be assigned time slots in this manner. Also note that moving leaf nodes can be identified in any suitable manner, such as by indicating the movement in slot requests from the mobile leaf nodes. Further note that these leaf nodes can be assigned pre-allocated network addresses, and the infrastructure nodes are configured to allot the special time slots for these special leaf nodes. Moreover, special security keys for moving leaf nodes can be provided by the server 114 and can be used to identify the address, slot number, frequency-hopping sequence, and other information of the leaf nodes. The keys can be distributed in any suitable manner, such as by using memory cards. In addition, these leaf nodes can simply perform clock synchronization operations at startup and begin communicating, without regards to which infrastructure nodes it is currently communicating.

Figure 12:
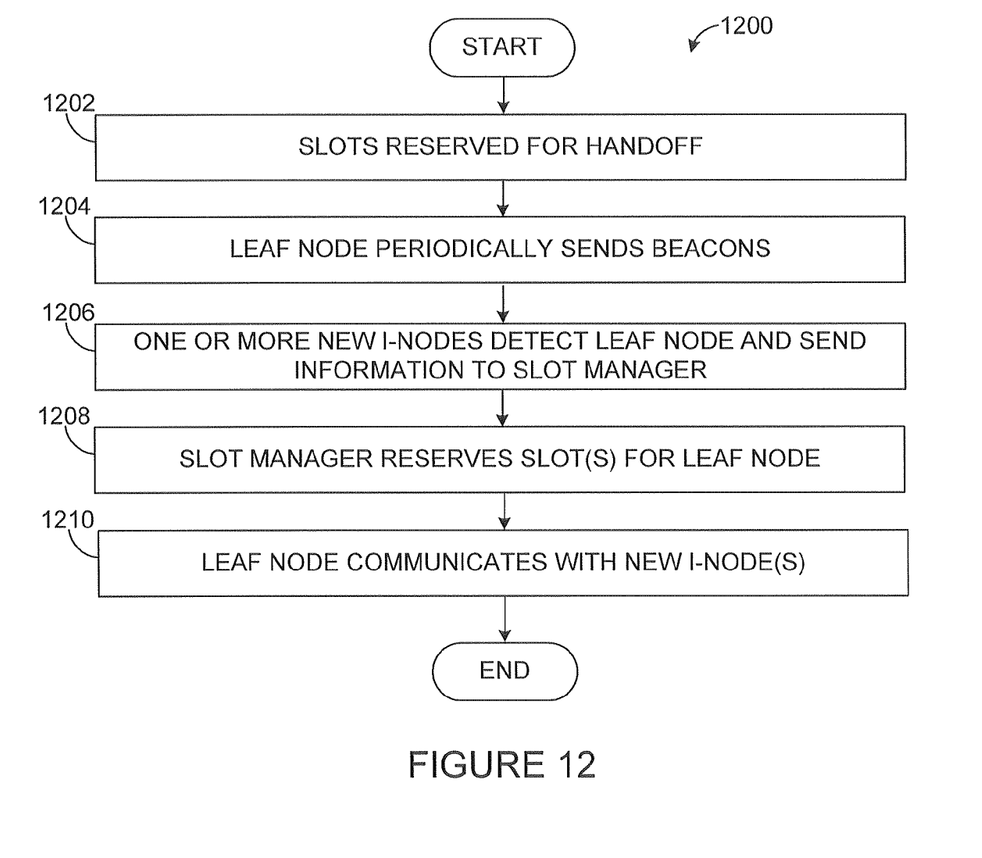
Figure 13:
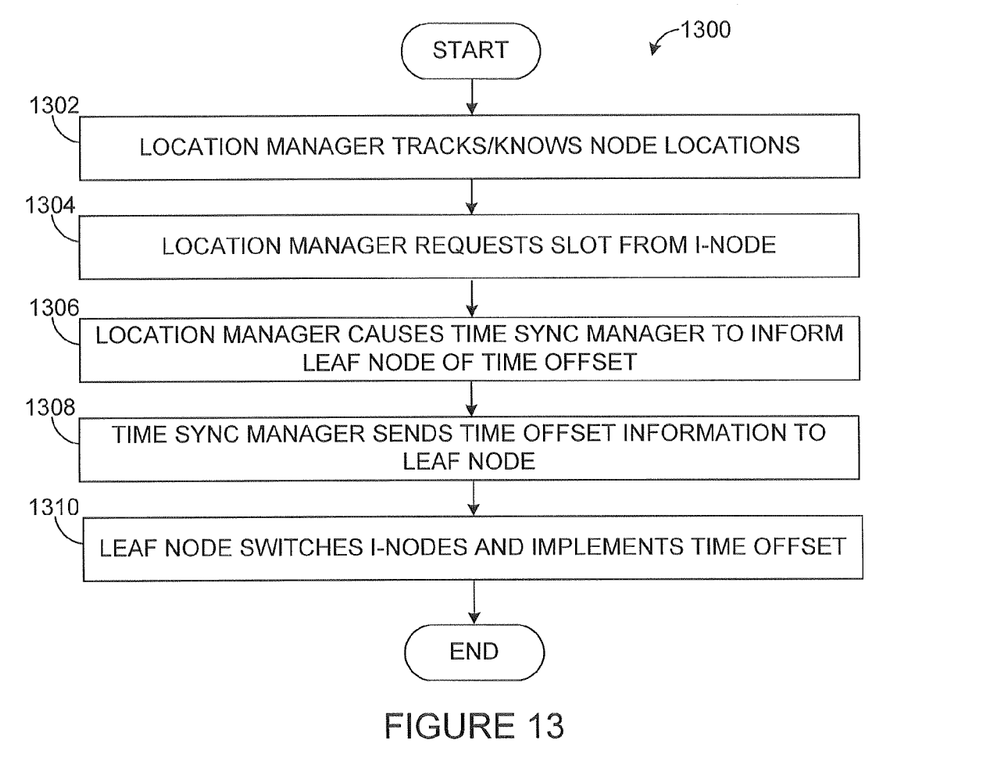

In FIG. 12, a method 1200 is used to support diversity handoffs of mobile leaf nodes. Time slots are reserved for handoffs at step 1202. In these slots, a handoff frequency pattern is known and may be the same for all devices. A leaf node sends periodic beacons, such as if it is moving, at step 1204. This can be done using the reserved time slots and the known frequency pattern. This informs new infrastructure nodes of the leaf node's presence. Note that the leaf node's current infrastructure node(s) can also trigger the leaf node to send the beacon. One or more new infrastructure nodes detect the beacons and send information about the leaf node to the global slot manager at step 1206, and the global slot manager reserves time slots in the new infrastructure nodes for the leaf node at step 1208. The global slot manager informs the leaf node and the new infrastructure nodes of this reservation, and the leaf node communicates with the new infrastructure nodes at step 1210. Note that the leaf node could possibly communicate with its old and new infrastructure nodes for a small period of time until the handoff is completed. When the leaf node moves infrastructure nodes, it can initiate dialog in a handoff slot with the global slot manager to delete its old slots and can initiate dialog in a handoff slot with its new infrastructure node to get any necessary information.

Once again, the movement of the leaf node can cause a change in the leaf node's cluster. This could be handled as shown in FIG. 8 as described above. This could also be handled using a method 1300 shown in FIG. 13. In this example, the location manager tracks or knows the location of various nodes at step 1302. This may include, for example, the location manager receiving information defining the locations of the infrastructure nodes and information defining the current location of a leaf node. The location manager could also inform the leaf node of any nearby infrastructure nodes and their information (such as their clusters). When a leaf node nears an infrastructure node, the location manager requests a slot from the infrastructure node at step 1304. The location manager also instructs the time synchronization manager to inform the leaf node of time offset information for the new infrastructure node's cluster at step 1306, which the time synchronization manager does at step 1308. If the infrastructure node is in the same cluster, the time offset information could be zero. If the infrastructure node is in a different cluster, the time offset information is likely non-zero. The leaf node then switches and begins communicating with a new infrastructure node and implements a time shift based on the time offset information at step 1310. Alternatively, the leaf node could switch infrastructure nodes and perform a time synchronization operation where the leaf node requests time sync information (which might be a more lengthy process). In either case, the leaf node is then synchronized with a new cluster (if necessary).

Although FIGS. 4 through 13 illustrate example methods and related details for supporting mobile nodes in industrial control and automation systems and other systems, various changes may be made to FIGS. 4 through 13. For example, various handoff techniques could be combined or used in different situations, or operations in one technique could be used in other techniques. Also, any suitable time frame structure could be used, and any suitable cluster structure could be used in a wireless network. In addition, other or additional techniques could be used to support mobility of leaf nodes in a wireless network.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    providing wireless service to a mobile leaf node using at least one first infrastructure node in an industrial control or monitoring system;
    determining whether the mobile leaf node is moving away from the at least one first infrastructure node by determining a rate of change of a signal associated with the wireless service, wherein determining the rate of change comprises detecting link degradation associated with the wireless service and a rate of change of the link degradation at the mobile leaf node, wherein the link degradation is detected prior to a loss of connectivity with the at least one first infrastructure node; and
    in response to detecting a movement of the mobile leaf node away from the at least one first infrastructure node, handing off the mobile leaf node to at least one second infrastructure node in the industrial control or monitoring system so that the at least one second infrastructure node provides the wireless service to the mobile leaf node, wherein the wireless service provided by the at least one first infrastructure node or by the at least one second infrastructure node to the mobile leaf node remains deterministic.

2. The method of claim 1, wherein the movement is detected prior to a loss of connectivity with the leaf node.

3. The method of claim 1, wherein:
    handing off the mobile leaf node to the at least one second infrastructure node comprises:
        broadcasting a request from the mobile leaf node using a known frequency-hopping pattern during one or more reserved time slots; and
        receiving the request at the at least one second infrastructure node, wherein the at least one second infrastructure node is in a different cluster of nodes than the at least one first infrastructure node; and
    the mobile leaf node continues communicating with the at least one first infrastructure node during one or more subsequent reserved time slots until the handoff is complete.

4. The method of claim 1, wherein:
    determining whether the mobile leaf node is moving comprises tracking a location of the mobile leaf node; and
    handing off the mobile leaf node comprises:
        identifying the at least one second infrastructure node that is in a vicinity of the mobile leaf node; and
        allocating one or more time slots for the mobile leaf node in the at least one second infrastructure node that is in the vicinity of the mobile leaf node.

5. The method of claim 4, wherein the mobile leaf node is allocated one or more time slots dedicated to the mobile leaf node in at least one of the infrastructure nodes.

6. The method of claim 5, wherein:
    the mobile leaf node broadcasts a beacon during one or more time slots reserved for handoffs; and
    the mobile leaf node is allocated one or more time slots dedicated to the mobile leaf node in the at least one second infrastructure node that receives the beacon.

7. The method of claim 4, wherein:
    the at least one first infrastructure node and the at least one second infrastructure node are in different clusters of nodes; and
    handing off the mobile leaf node further comprises identifying a time offset between the clusters and providing the time offset to the mobile leaf node, wherein the mobile leaf node implements the time offset when communicating with the at least one second infrastructure node.

8. The method of claim 1, wherein:
    the infrastructure nodes communicate with multiple leaf nodes using frequency-hopping time division multiple access communications; and
    the handing off of the mobile leaf node supports redundant connectivity of the mobile leaf node with at least two of the infrastructure nodes.

9. A system comprising:
    a plurality of infrastructure nodes each configured to provide wireless service in a specified area, the plurality of infrastructure nodes including at least one first infrastructure node and at least one second infrastructure node;
    a mobile leaf node configured to perform one or more functions associated with an industrial control or monitoring system; and
    a location manager configured to determine whether the mobile leaf node is moving away from the at least one first infrastructure node based on a rate of change of a signal associated with the wireless service;
    wherein the mobile leaf node is configured to determine the rate of change by detecting link degradation associated with the wireless service and a rate of change of the link degradation at the mobile leaf node prior to a loss of connectivity with the at least one first infrastructure node; and
    wherein, when the mobile leaf node is receiving the wireless service from the at least one first infrastructure node, motion of the mobile leaf node away from the at least one first infrastructure node triggers a handoff of the mobile leaf node to the at least one second infrastructure node so that the at least one second infrastructure node provides the wireless service to the mobile leaf node, and wherein the wireless service provided by the at least one first infrastructure node or by the at least one second infrastructure node to the mobile leaf node remains deterministic.

10. The system of claim 9, wherein:
    the at least one first infrastructure node is configured to detect the motion of the mobile leaf node using at least one of a signal strength indicator, a time of arrival, and a direction of arrival associated with the wireless service prior to a loss of connectivity with the leaf node; and
    the at least one first infrastructure node is configured to cause the leaf node to search for another infrastructure node.

11. The system of claim 9, wherein:
    the leaf node is configured to broadcast a request using a known frequency-hopping pattern during one or more reserved time slots; and
    the at least one second infrastructure node is configured to receive the request, the at least one second infrastructure node in a different cluster of nodes than the at least one first infrastructure node.

12. The system of claim 9, further comprising:
    a slot manager configured to allocate one or more time slots for the mobile leaf node in the at least one second infrastructure node that is in a vicinity of the mobile leaf node;
    wherein the location manager is configured to identify the at least one second infrastructure node that is in the vicinity of the mobile leaf node.

13. The system of claim 12, wherein the slot manager is configured to allocate one or more time slots dedicated to the mobile leaf node in at least one of the infrastructure nodes.

14. The system of claim 12, wherein:
the mobile leaf node is configured to broadcast a beacon during one or more time slots reserved for handoffs;
the slot manager is configured to allocate one or more time slots dedicated to the mobile leaf node in the at least one second infrastructure node that receives the beacon;
the at least one first infrastructure node and the at least one second infrastructure node are in different clusters of nodes; and
the system further comprises a time synchronization manager configured to identify a time offset between the clusters and to provide the time offset to the mobile leaf node, wherein the mobile leaf node is configured to implement the time offset when communicating with the at least one second infrastructure node.

15. An apparatus configured to perform one or more functions associated with an industrial control or monitoring system, the apparatus comprising:
a transceiver configured to communicate wirelessly with a plurality of infrastructure nodes including at least one first infrastructure node and at least one second infrastructure node; and
a controller configured to determine whether the apparatus is moving away from the at least one first infrastructure node and, in response to determining that the apparatus is moving away from the at least one first infrastructure node providing wireless service to the apparatus, to initiate a handoff to the at least one second infrastructure node so that the at least one second infrastructure node provides the wireless service to the apparatus, wherein the wireless service provided to the apparatus by the at least one first infrastructure node or by the at least one second infrastructure node remains deterministic;
wherein the controller is configured to determine whether the apparatus is moving away from the at least one first infrastructure node by detecting link degradation associated with the wireless service and a rate of change of the link degradation at the apparatus prior to a loss of connectivity with the at least one first infrastructure node.

16. The apparatus of claim 15, wherein the one or more functions associated with the industrial control or monitoring system comprise at least one of:
a wireless sensor function; and
a wireless actuator function.

17. The apparatus of claim 15, wherein the apparatus includes a motion sensor configured to detect a motion of the apparatus.

18. The system of claim 9, wherein the mobile leaf node includes a motion sensor configured to detect the motion of the apparatus mobile leaf node.

19. The system of claim 9, wherein the mobile leaf node is associated with a rail car that is monitored in a rail car monitoring system.

20. The method of claim 1, wherein the mobile leaf node is associated with a rail car that is monitored in a rail car monitoring system.

* * * * *